US012187309B2

(12) United States Patent
McNew et al.

(10) Patent No.: US 12,187,309 B2
(45) Date of Patent: Jan. 7, 2025

(54) STATIONARY VEHICLE ON A SHOULDER OF A ROAD NOTIFICATION

(71) Applicant: Toyota Motor Engineering & Manufacturing North America, Inc., Plano, TX (US)

(72) Inventors: John-Michael McNew, Ann Arbor, MI (US); Yu Liu, Ann Arbor, MI (US); Brian A Mulrooney, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 18 days.

(21) Appl. No.: 18/104,613

(22) Filed: Feb. 1, 2023

(65) Prior Publication Data
US 2024/0253651 A1 Aug. 1, 2024

(51) Int. Cl.
*G08B 21/00* (2006.01)
*B60W 40/02* (2006.01)
*B60W 50/00* (2006.01)
*B60W 50/14* (2020.01)

(52) U.S. Cl.
CPC ............ *B60W 50/14* (2013.01); *B60W 40/02* (2013.01); *B60W 50/0097* (2013.01); *B60W 2050/143* (2013.01); *B60W 2050/146* (2013.01); *B60W 2554/20* (2020.02); *B60W 2554/404* (2020.02)

(58) Field of Classification Search
USPC ...... 340/425.5, 438, 426.19, 426.22, 426.26, 340/447, 457, 463, 466, 471, 488, 506, 340/539.13, 571
See application file for complete search history.

(56) References Cited

U.S. PATENT DOCUMENTS

| | | | | |
|---|---|---|---|---|
| 10,137,890 B2* | 11/2018 | Sakai | ................ | B60W 60/0016 |
| 10,916,134 B2* | 2/2021 | Gesch | ...................... | B60Q 9/00 |
| 11,541,910 B1* | 1/2023 | Ganguli | ............ | B60W 60/0027 |
| 2020/0207346 A1* | 7/2020 | Tsuji | ..................... | B60W 30/12 |
| 2022/0410894 A1* | 12/2022 | Foster | .................. | B60W 40/10 |

* cited by examiner

*Primary Examiner* — Daniel Previl
(74) *Attorney, Agent, or Firm* — Christopher G. Darrow; DARROW MUSTAFA PC

(57) ABSTRACT

Systems, methods, and other embodiments described herein relate to assisting vehicles approaching a target vehicle that is stationary on a shoulder of a road. In one embodiment, a method includes determining one or more characteristics of the target vehicle that is a stationary vehicle on the shoulder of the road, predicting how much time the target vehicle will be on the shoulder based on at least the one or more characteristics of the target vehicle, and determining whether to generate a notification associated with the target vehicle based on at least a prediction of how much time the target vehicle will be on the shoulder.

20 Claims, 6 Drawing Sheets

STATIONARY VEHICLE ON A SHOULDER OF A ROAD NOTIFICATION

TECHNICAL FIELD

The subject matter described herein relates, in general, to systems and methods for generating a notification about a target vehicle that is stationary on a shoulder of a road.

BACKGROUND

A vehicle may include one or more sensors that detect and relay information about the environment in which the vehicle is travelling. However, the vehicle may be impacted by an environment beyond the reach of the vehicle sensors. The vehicle may benefit from including information from an environment beyond the reach of its vehicle sensors in its decision-making process.

SUMMARY

In one embodiment, a system for generating a notification about a target vehicle that is stationary on a shoulder of a road is disclosed. The system includes a processor and a memory in communication with the processor. The memory stores machine-readable instructions that, when executed by the processor, cause the processor to determine one or more characteristics of the target vehicle. The target vehicle is a stationary vehicle on the shoulder of the road. The memory stores machine-readable instructions that, when executed by the processor, cause the processor to predict how much time the target vehicle will be on the shoulder based on at least the one or more characteristics of the target vehicle and determine whether to generate a notification associated with the target vehicle based on at least a prediction of how much time the target vehicle will be on the shoulder.

In another embodiment, a method for generating a notification about a target vehicle that is stationary on a shoulder of a road is disclosed. The method includes determining one or more characteristics of the target vehicle. The target vehicle is a stationary vehicle on the shoulder of the road. The method includes predicting how much time the target vehicle will be on the shoulder based on at least the one or more characteristics of the target vehicle and determining whether to generate a notification associated with the target vehicle based on at least a prediction of how much time the target vehicle will be on the shoulder.

In another embodiment, a non-transitory computer-readable medium for generating a notification about a target vehicle that is stationary on a shoulder of a road and including instructions that, when executed by a processor, cause the processor to perform one or more functions is disclosed. The instructions include instructions to determine one or more characteristics of the target vehicle. The target vehicle is a stationary vehicle on the shoulder of the road. The instructions include instructions to predict how much time the target vehicle will be on the shoulder based on at least the one or more characteristics of the target vehicle and determine whether to generate a notification associated with the target vehicle based on at least a prediction of how much time the target vehicle will be on the shoulder.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
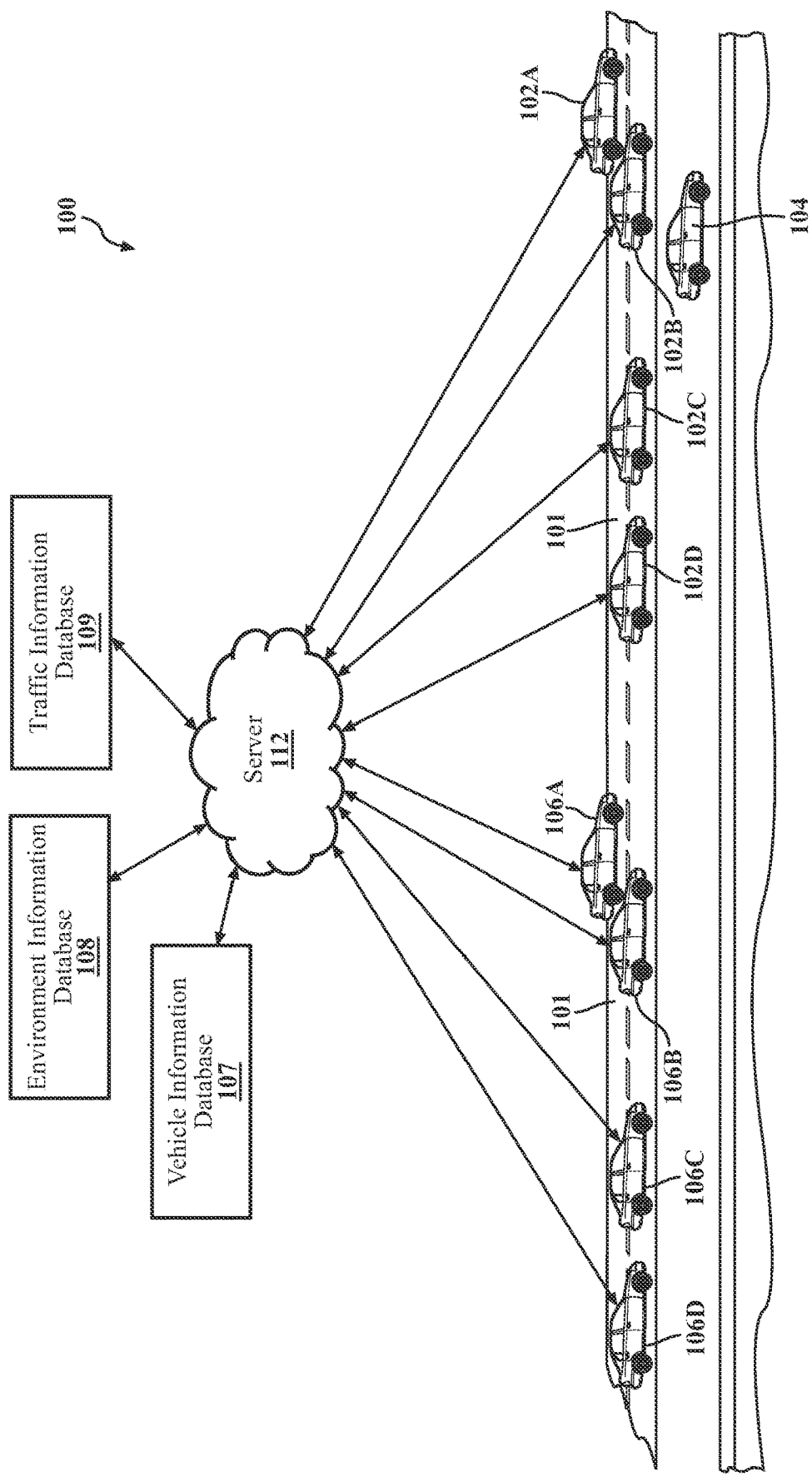
FIG. 1 is an example of a stationary vehicle notification system.

Systems, methods, and other embodiments associated with generating a notification about a target vehicle that is stationary on a shoulder of a road are disclosed. A host vehicle travelling on a route may be unable to determine that there is a portion of the route that may become inaccessible or at least, challenging to navigate due to the target vehicle being stationary on the shoulder of the road.

Accordingly, in one embodiment, the disclosed approach is a system that generates a notification about the target vehicle being stationary on the shoulder of the road. As an example, the system may receive information about the target vehicle(s) from vehicle sensors in surrounding vehicles proximate to the target vehicle(s) and from non-vehicle entities such as the roadside servers and vehicle information database(s). The information about the target vehicle(s) may include the vehicle type (e.g., vehicle model, brand, and/or size), the vehicle condition (e.g., flat tire, damage to the vehicle, and/or vehicle on fire or smoking), vehicle orientation (e.g., vehicle facing oncoming traffic, vehicle is upside down, or vehicle is on its side), and vehicle lights (e.g., hazard lights are on or off, or front lights are on or off). The system may receive information about the environment from vehicle sensors and non-vehicle entities such as roadside servers, environment information database(s), and traffic information database(s). The information about the environment may include a weather condition, a road condition, a person proximate to the target vehicle, and/or another vehicle proximate to the target vehicle.

The system may determine whether how much time the target vehicle may remain stationary on the shoulder of the road using any suitable algorithm. The system may determine how much time the target vehicle may remain stationary on the shoulder of the road based on characteristics of the target vehicle, such as the vehicle type and the vehicle orientation, and characteristics of the environment, such as weather conditions which may be based on data from weather services, road conditions which may be based on data from traffic information services, presence of persons such as emergency personnel or passers-by, or presence of additional vehicles such as a police vehicle or a tow truck. As an example, the system may be located in a cloud server, and may predict how much time the target vehicle may remain on the shoulder based on data such as vehicle characteristics, weather conditions from weather services, and traffic conditions from traffic information services.

The system may be in a host vehicle and/or in a cloud server. The host vehicle may be any vehicle other than the target vehicle. The system may further determine the impact that the target vehicle being stationary on the shoulder of the road may have on the surrounding vehicle(s) and approaching vehicles, such as the host vehicle. The system may further determine an action for impacted vehicles to take, such as taking an alternate route, slowing down, and/or parking.

In a case where the system predicts that the target vehicle will remain on the shoulder long enough to impact the host vehicle(s), the system may generate a notification. The system may send the notification to the host vehicle, a surrounding vehicle, a second vehicle, and/or a non-vehicular entity like a cloud server or an information database. The notification may include information about the impact of the target vehicle being stationary on the shoulder of the road, and an action that the impacted vehicle may take. As an example, the notification may include a warning to one or more other vehicles, indicating that the target vehicle is stationary on the shoulder of the road. The notification may further include a suggestion to the other vehicle(s) to maintain a safe distance, avoid the road proximate to the target vehicle, change lanes, and/or take an alternate route.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details.

Referring to FIG. 1, an example of a stationary vehicle notification system 100 is shown. The stationary vehicle notification system 100 may include various elements, which may be communicatively linked in any suitable form. As an example, the elements may be connected, as shown in FIG. 1. Some of the possible elements of the stationary vehicle notification system 100 are shown in FIG. 1 and will now be described. It will be understood that it is not necessary for the stationary vehicle notification system 100 to have all the elements shown in FIG. 1 or described herein. The stationary vehicle notification system 100 may have any combination of the various elements shown in FIG. 1. Further, the stationary vehicle notification system 100 may have additional elements to those shown in FIG. 1. In some arrangements, the stationary vehicle notification system 100 may not include one or more of the elements shown in FIG. 1. Further, it will be understood that one or more of these elements may be physically separated by large distances.

The elements of the stationary vehicle notification system 100 may be communicatively linked through one or more communication networks. As used herein, the term "communicatively linked" may include direct or indirect connections through a communication channel or pathway or another component or system. A "communication network" means one or more components designed to transmit and/or receive information from one source to another. The one or more of the elements of the stationary vehicle notification system 100 may include and/or execute suitable communication software, which enables the various elements to communicate with each other through the communication network and perform the functions disclosed herein.

The one or more communication networks may be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further may be implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network may include wired communication links and/or wireless communication links. The communication network may include any combination of the above networks and/or other types of networks.

The stationary vehicle notification system 100 may include one or more connected vehicles. As used herein, "vehicle" means any form of motorized transport. In one or more implementations, the vehicle may be an automobile. While arrangements will be described herein with respect to automobiles, it will be understood that embodiments are not limited to automobiles. In some implementations, the vehicle may be any device that, for example, transports passengers and includes the noted sensory devices from which the disclosed predictions and determinations may be generated. The vehicle may be any other type of vehicle that may be used on a roadway, such as a motorcycle. In some implementations, the vehicle may be a watercraft, an aircraft, or any other form of motorized transport. The stationary vehicle notification system 100 may include a host vehicle 106A, 106B, 106C, 106D (collectively known as 106). The host vehicle 106 may be a connected vehicle that is communicatively linked to one or more elements of the stationary vehicle notification system 100. The host vehicle 106 may include any vehicle that is within a sphere or distance of impact. In other words, the host vehicle 106 may be any vehicle that is being impacted by a target vehicle 104 being on the shoulder of the road 101. The impact may include that the host vehicle 106 is caught in traffic, has to slow down, change lanes, or determine an alternate route.

The stationary vehicle notification system 100 may include one or more entities that may exchange information with the host vehicle 106. The entities may include other vehicles such as the target vehicle 104 that is stationary on a shoulder of a road. The target vehicle 104 may be a connected vehicle or may not be a connected vehicle. The entities may further include surrounding vehicle(s) 102A, 102B, 102C, 102D (collectively known as 102) that are proximate to the target vehicle(s) 104, and/or vehicles (also known as the second vehicles) 106 that are driving towards on or towards the road 101 and may be impacted by the target vehicle(s) 104. The second vehicles 106 may include one or more host vehicles 106. The entities may include roadside units and/or other information databases such as a vehicle information database 107, an environment information database 108, and a traffic information database 109.

The stationary vehicle notification system 100 may include one or more servers 112. The server(s) 112 may be, for example, cloud-based server(s) or edge-based server(s). The server(s) 112 may communicate with one or more vehicles 102, 104, 106 over a communication module, such as by any type of vehicle-to-cloud (V2C) communications, now known or later developed. The server(s) 112 may receive data from and send data to the vehicle(s) 102, 104, 106. Alternatively and/or additionally, the server 112, the host vehicle 106 and the other vehicles 102, 104, 106 may communicate over other suitable means such as vehicle-to-vehicle (V2V) communications and/or vehicle-to-everything (V2X) communications.

Figure 2:
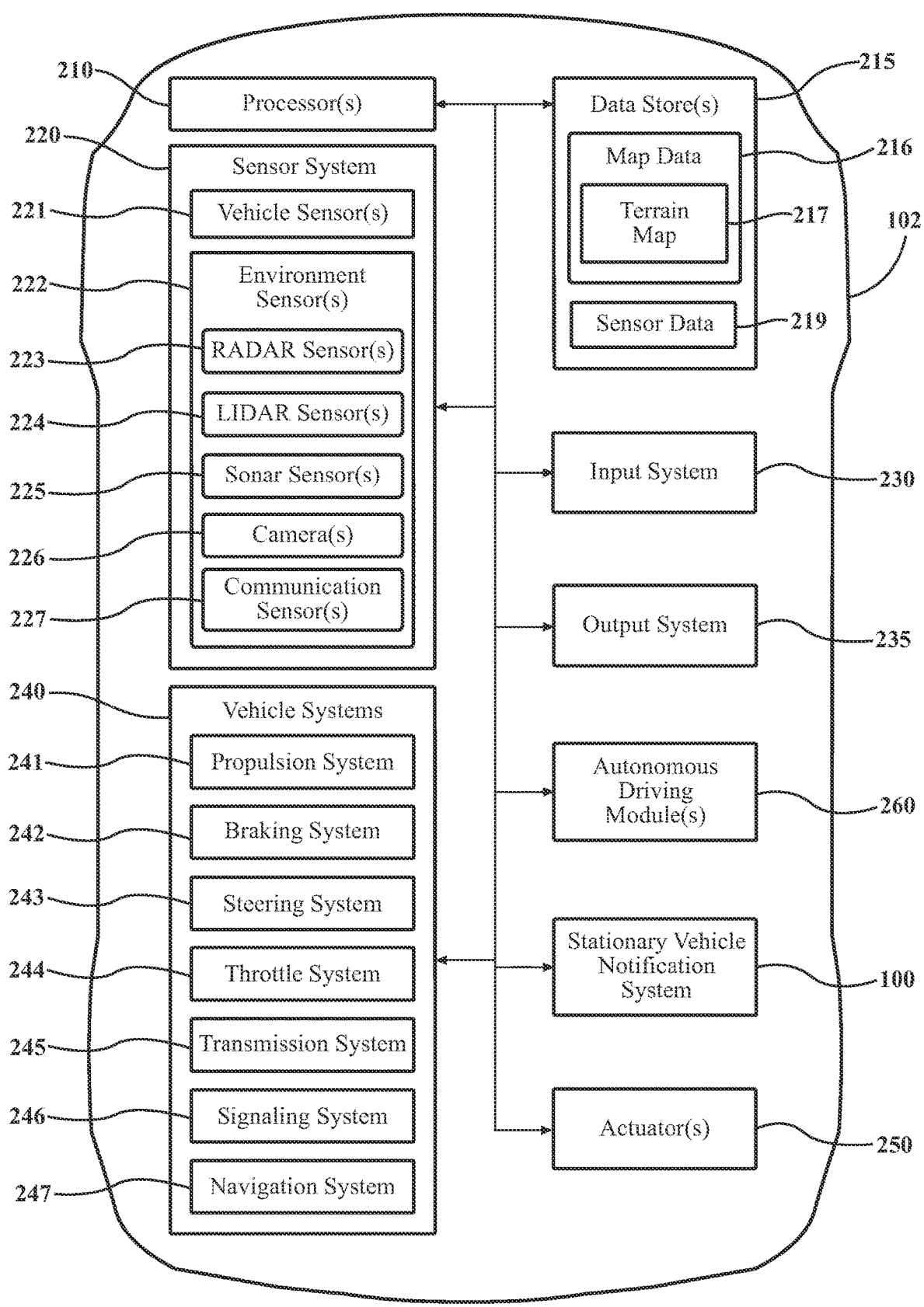
FIG. 2 illustrates a block diagram of a vehicle incorporating a stationary vehicle notification system.

Referring to FIG. 2, a block diagram of the host vehicle 106 incorporating a stationary vehicle notification system 100 is illustrated. The host vehicle 106 includes various elements. It will be understood that in various embodiments, it may not be necessary for the host vehicle 106 to have all of the elements shown in FIG. 2. The host vehicle 106 may have any combination of the various elements shown in FIG. 2. Further, the host vehicle 106 may have additional elements to those shown in FIG. 2. In some arrangements, the host vehicle 106 may be implemented without one or more of the elements shown in FIG. 2. While the various elements are shown as being located within the host vehicle 106 in FIG. 2, it will be understood that one or more of these elements may be located external to the host vehicle 106. Further, the elements shown may be physically separated by large distances. For example, as discussed, one or more components of the disclosed system may be implemented within a vehicle while further components of the system are implemented within a cloud-computing environment, as discussed further subsequently.

Some of the possible elements of the host vehicle 106 are shown in FIG. 2 and will be described along with subsequent figures. However, a description of many of the elements in FIG. 2 will be provided after the discussion of FIGS. 3-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 2, the host vehicle 106 includes a stationary vehicle notification system 100 that is implemented to perform methods and other functions as disclosed herein relating to generating a notification about the target vehicle 104 being stationary on the shoulder of the road 101. As will be discussed in greater detail subsequently, the stationary vehicle notification system 100, in various embodiments, may be implemented partially within the host vehicle 106 and may further exchange communications with additional aspects of the stationary vehicle notification system 100 that are remote from the host vehicle 106 in support of the disclosed functions. Thus, while FIG. 3 generally illustrates the stationary vehicle notification system 100 as being self-contained, in various embodiments, the stationary vehicle notification system 100 may be implemented within multiple separate devices, some of which may be remote from the host vehicle 106.

Figure 3:
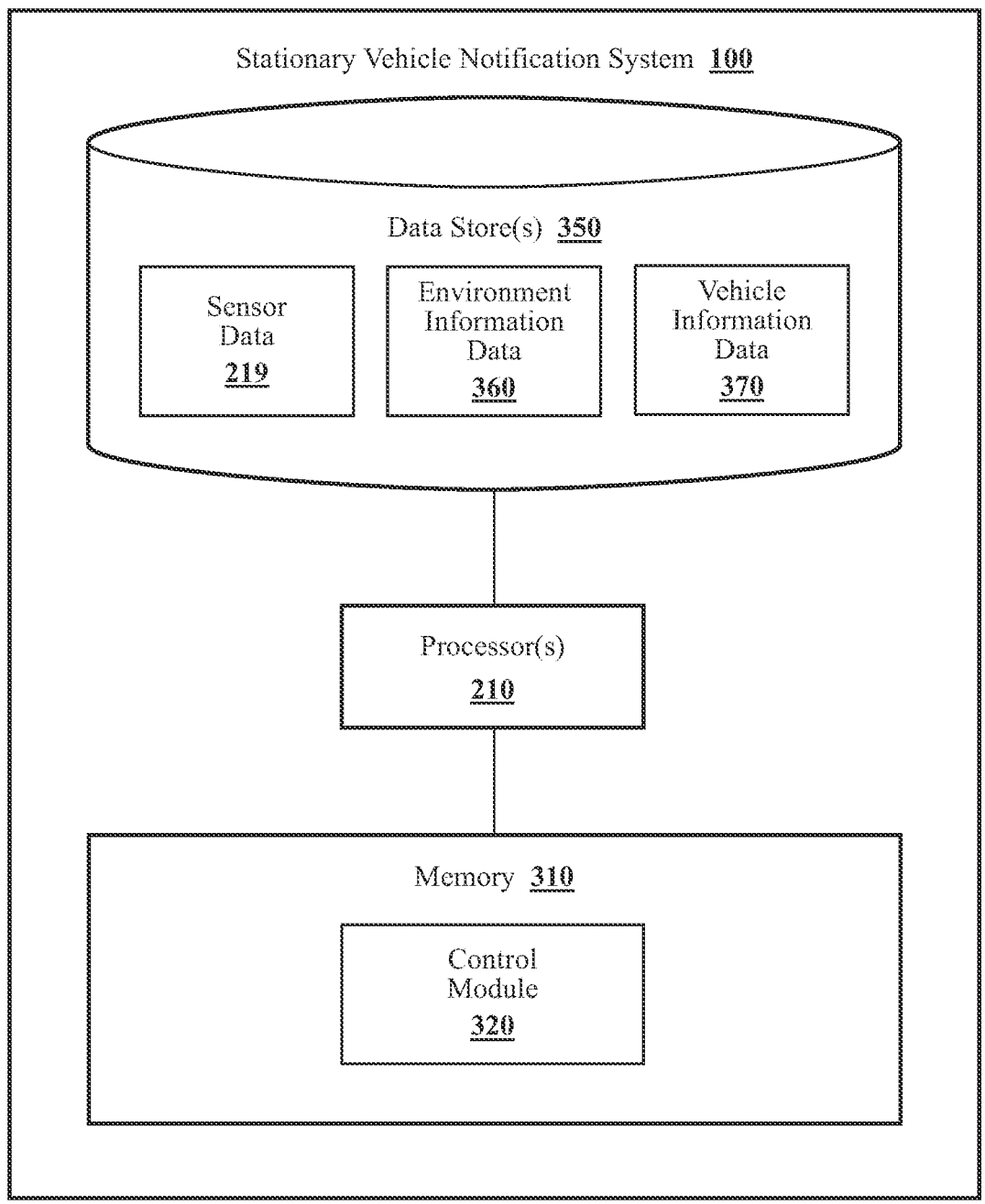
FIG. 3 illustrates an embodiment of a stationary vehicle notification system of FIG. 2.

With reference to FIG. 3, one embodiment of the stationary vehicle notification system 100 of FIG. 2 is further illustrated. The stationary vehicle notification system 100 is shown as including a processor 210 from the host vehicle 106 of FIG. 2. Accordingly, the processor 210 may be a part of the stationary vehicle notification system 100, the stationary vehicle notification system 100 may include a separate processor from the processor 210 of the host vehicle 106, and/or the stationary vehicle notification system 100 may access the processor 210 through a data bus or another communication path. In further aspects, the processor 210 is a cloud-based resource that communicates with the stationary vehicle notification system 100 through a communication network. In one embodiment, the stationary vehicle notification system 100 includes a memory 310 that stores a control module 320. The memory 310 is a random-access memory (RAM), read-only memory (ROM), a hard-disk drive, a flash memory, or other suitable memory for storing the control module 320. The control module 320 includes, for example, computer-readable instructions within the physical memory 310 that when executed by the processor 210 cause the processor 210 to perform the various functions disclosed herein.

In one embodiment, the stationary vehicle notification system 100 includes a data store 350. The data store 350 is, in one embodiment, an electronic data structure (e.g., a database) stored in the memory 310 or another data store and that is configured with routines that may be executed by the processor 210 for analyzing stored data, providing stored data, organizing stored data, and so on. Thus, in one embodiment, the data store 350 stores data used by the control module 320 in executing various functions. In one embodiment, the data store 350 includes the sensor data 219 along with, for example, environment information data 360, vehicle information data 370, and or other information that is used by the control module 320.

The sensor data 219 may originate from one or more external sources. The external sources may include any entities capable of wireless communication such as other vehicles including the target vehicle 104, the surrounding vehicle(s) 102, the host vehicle(s) 106, the roadside units, servers 112, and/or databases 107, 108, 109. As such, the sensor data 219 may originate from the sensor system 220 of the host vehicle 106.

The sensor data 219 may include information relating to the target vehicle 104, one or more characteristics of the target vehicle 104, and/or one or more characteristics of the environment surrounding the target vehicle 104. The sensor data 219 may include characteristics of the target vehicle 104, such as a vehicle type, a vehicle condition, a vehicle orientation, and/or a vehicle light status. The vehicle type may include a model, a vehicle style (e.g., a truck, a sedan, a bus, a motorcycle, a bicycle), a use (e.g., a service vehicle such as an ambulance, a police vehicle, a tow truck, or a private vehicle such as personal sedan or minivan), a vehicle size, and/or any other suitable information. The vehicle condition may include the vehicle having a flat tire, damage to the vehicle, one or more vehicle windows being open, one or more vehicle doors being open, and/or the vehicle giving off smoke and/or being on fire. The vehicle condition may include the vehicle appearing to be abandoned (e.g., leaves or snow on top of the vehicle indicating the vehicle has been there for more than an hour or two), and/or the vehicle being jacked up. The vehicle orientation may include the direction the vehicle is facing, the vehicle being in an upright position or an upside-down position, the vehicle being on its side, the vehicle resting on the front end or the rear end of the vehicle. The vehicle light status may include the front lights, rear lights, brake lights, and/or hazard lights being on, off, or flashing.

The sensor data 219 may include the characteristics in the environment surrounding the target vehicle 104, such as a weather condition, a road condition, a person proximate to the target vehicle 104, another vehicle proximate to the target vehicle 104. The information about the weather condition may include a current and/or past weather condition of a location in the environment and the related geographic coordinates for the location in the environment. The weather condition may include the type of weather (e.g., raining, snowing, high winds, hail, thunderstorm, a cyclone, a tornado, etc.) and/or impacts of the weather (e.g., fog, flooding, fallen snow, black ice, etc.). The road condition may include the type of road (e.g., highway, country road, city road), type of shoulder, the road surface (e.g., asphalt, gravel, grass, etc.), gradient level, curvature, friction level, presence of potholes, road debris, vegetation, occlusions, and/or the presence of road delineators such as lane markers, road edge markers, traffic signs, traffic lights, etc. The sensor data 219 may include one or more persons proximate to the target vehicle 104. The sensor data 219 may include characteristics about the persons such as a profession (e.g., a first responder, a police officer, a fire fighter, a paramedic, a civilian, etc.), age (e.g., an adult, a youth, an infant, etc.), condition (e.g., person is injured or in distress, standing, laying on the ground, etc.). The sensor data 219 may include one or more vehicles proximate to the target vehicle 104. The sensor data 219 may include characteristics about the vehicles such as number of vehicles, types of vehicles (e.g., emergency vehicles, commercial vehicles, civilian vehicles, etc.). The sensor data 219 may include traffic information such as traffic levels, a number of vehicles on the road, the type of vehicle(s), the position of the vehicle(s) relative to each other, the speed of the vehicle(s), recorded accidents, and/or the direction of travel of the vehicle(s).

The environment information data 360 may include information about a weather condition, traffic, and/or a physical characteristic of the environment surrounding the target vehicle 104. The environment information data 360 may originate from one or more databases such as an environment information database 108 and/or a traffic information database 109.

The information about the traffic may include information about the past, current, and/or future traffic levels at the location. The information about the traffic may include the number of vehicles, the type of vehicle(s), the position of the vehicle(s) relative to each other, the speed of the vehicle(s), the direction of travel of the vehicle(s), and traffic rules based on the jurisdiction at the location. The information about traffic may be based on observed events and/or historical data.

The vehicle information data 370 may include information about vehicles such as vehicle brands, vehicle models, vehicle types, vehicle reliability data (e.g., likelihood of a vehicle brand/model breaking down), and/or historical information about vehicles.

In one embodiment, the control module 320 includes instructions that function to control the processor 210 to determine one or more characteristics of the target vehicle 104. The target vehicle 104, as previously mentioned, is a stationary vehicle on a shoulder of a road 101. The control module 320 further includes instructions that function to control the processor 210 to predict how much time the target vehicle 104 will be on the shoulder based on at least the characteristics of the target vehicle 104 and determine whether to generate a notification associated with the target vehicle 104 based on at least a prediction of how much time the target vehicle 104 will be on the shoulder.

The control module 320 may receive the information about the target vehicle 104 from the target vehicle 104, sensor data 219, environment information data 360 and/or vehicle information data 370. The control module 320 may then determine the characteristics of the target vehicle 104 based on the information from the target vehicle 104, the sensor data 219, the environment information data 360, and/or the vehicle information data 370. As previously mentioned, the characteristics of the target vehicle 104 may include a vehicle type, a vehicle condition, a vehicle orientation, and/or a vehicle light status. The control module 320 may use any suitable methods, such as a machine learning process, to further determine the characteristics of the target vehicle 104.

The control module 320 may determine when the target vehicle 104 became stationary on the shoulder. As example, the control module 320 may communicate with the target vehicle 104 using V2V communication to inquire and receive the time that the target vehicle 104 became stationary on the shoulder. As another example, the control module 320 may determine when the target vehicle 104 became stationary based on sensor data. As another example, the control module 320 may inquire and receive the time that the target vehicle 104 became stationary from the sensors, and/or databases such as the traffic information database 109. As another example, the control module 320 may determine when the target vehicle 104 became stationary based on the condition of the target vehicle 104. In such an example, the control module 320 may determine that the target vehicle 104 has been stationary from the past night if there was a snowfall the past night and there are no fresh tire tracks. As another example, the control module 320 may determine that the target vehicle 104 has been stationary for less than 12 hours if the target vehicle 104 still has occupants. The control module 320 may determine an emergency response time based on historical records and may further determine that if the emergency response entity is with the target vehicle 104, then the target vehicle 104 has been stationary for at least the determined emergency response time. Additionally and/or alternatively, the control module 320 may determine that if the emergency response entity is not with the target vehicle 104, then the target vehicle 104 has been stationary for less than the determined emergency response time.

The control module 320 may determine one or more characteristics of an environment surrounding the target vehicle 104. As previously mentioned and as example, the characteristics of the environment may include the weather condition, the road condition, person(s) proximate to the target vehicle 104, and/or another vehicle proximate to the target vehicle 104. As an example, the control module 320 may determine the characteristics of the environment based on sensor data 219 and/or environment information data 360. The control module 320 may request and receive characteristics of the environment from the sensors, and/or databases such as the traffic information database 109.

The control module 320 may predict how much time the target vehicle 104 will be on the shoulder based on at least the one or more characteristics of the target vehicle 104. The control module 320 may utilize any suitable machine learning process to predict how much time the target vehicle 104 will remain on the shoulder. As an example, the control module 320 may determine how much time the target vehicle 104 will remain on the shoulder based on historical records relating to the characteristics of the target vehicle 104. In such an example, the control module 320 may determine that a target vehicle 104 that is a police vehicle in good condition, facing oncoming traffic may be currently monitoring the speeds of passing vehicles. The control module 320 may further determine how much time the police vehicle will remain in that position based on past or historical records of how much time police vehicles tend to remain in such positions. The control module 320 may utilize any suitable statistical method or distribution. As another example, the control module 320 may determine how much time the target vehicle 104 that is upside down and resting on its roof may remain in the position based on past or historical records of how much time it takes for emergency vehicles to arrive and how much time it takes to remove the target vehicle 104.

The control module 320 may predict how much time the target vehicle 104 will be on the shoulder based on at least the one or more characteristics of the environment. The control module 320 may utilize any suitable machine learning process to predict how much time the target vehicle 104 will remain on the shoulder. As an example, the control module 320 may determine how much time the target vehicle 104 will remain on the shoulder based on historical records relating to the characteristics of the environment. In such an example, the control module 320 may determine how much time the target vehicle 104 is going to be on the shoulder based on another vehicle, such as an emergency vehicle, being proximate to the target vehicle 104, and based on historical records of how much time it takes for the target vehicle 104 to be removed from the shoulder of the road after an emergency vehicle such as a tow truck or police vehicle arrives. The control module 320 may determine how much time the target vehicle 104 may remain on the shoulder based on the characteristics of the target vehicle 104 and/or the characteristics of the environment.

The control module 320 may determine whether to generate a notification associated with the target vehicle 104 based on at least a prediction of how much time the target vehicle 104 will be on the shoulder. As an example, the control module 320 may determine to generate the notification based on predicting that the target vehicle 104 will be on the shoulder for a relatively long period of time, e.g., at least an hour. As another example, the control module 320 may determine not to generate the notification based on predicting that the target vehicle 104 will be on the shoulder for a relatively short period of time, e.g., at most five minutes. The control module 320 may determine how much time the target vehicle 104 will remain on the shoulder as described above.

The control module 320 may determine how much time it will take for a host vehicle 106 to reach a location of the target vehicle 104 and may further determine whether to generate a notification associated with the target vehicle 104 based on at least a prediction of whether the target vehicle 104 is at the location when the host vehicle 106 reaches the location. As an example, the control module 320 may determine a route from a present location of the host vehicle 106 to the location of the target vehicle 104 and then, predict the time it will take for the host vehicle 106 to arrive at the location of the target vehicle 104 based on at least the determined route.

As an example, the control module 320 may determine whether to generate the notification associated with the target vehicle 104 based on at least a prediction of whether the target vehicle 104 will still be at the location when the host vehicle 106 reaches the location by comparing the time it will take the host vehicle 106 to arrive at the location of the target vehicle 104 to how much time the target vehicle 104 is predicted to be on the shoulder. The control module 320 may determine to generate the notification in the case where the time it will take the host vehicle 106 to arrive at the location of the target vehicle 104 is less than how much time the target vehicle 104 will be at the location. Alternatively, the control module 320 may determine not to generate the notification in the case where the time it will take the host vehicle 106 to arrive at the location of the target vehicle 104 is more than how much time the target vehicle 104 will be at the location.

As an example, the control module 320 may determine whether to generate the notification based on predicting whether the host vehicle 106 will be impacted by the target vehicle 104 being on the shoulder. In such an example, the control module 320 may determine whether the host vehicle 106 will travel past the location of the target vehicle 104. The control module 320 may determine that the host vehicle 106 will travel past the target vehicle 104 based on, as an example, the route generated by a navigation system in the host vehicle 106. The control module 320 may determine that the host vehicle 106 will travel past the target vehicle 104 based on, as another example, the host vehicle 106 being on a road heading towards the location of the target vehicle 104 and there are no exits between the host vehicle 106 and the location of the target vehicle 104. The control module 320 may request and receive information about traffic patterns such as traffic slowdowns or lane closures near the target vehicle 104. The control module 320 may generate the notification in a case where the control module 320 has determined that there will be traffic slowdowns or lane closures ahead of the host vehicle 106.

The control module 320 may generate a notification by alerting an operator using one or more of an audio alert, a visual alert, or haptic alert. The control module 320 may generate a notification by outputting an electronic signal. The notification may include information about the impact and/or the alternate route for the host vehicle 106 so as to avoid the target vehicle 104. As an example, the notification may include a warning to the host vehicle 106, indicating that the target vehicle 104 is on the shoulder. The notification may further include a suggestion to the host vehicle 106 to maintain a safe distance, avoid the road that the target vehicle 104 is travelling on, change lanes, and/or take the alternate route. The control module 320 may generate the notification in any suitable format such as text, images, and audio. As an example, the visual alert may be displayed on a display interface in the host vehicle 106 that is visible to the operator. As another example, the audible alert may be output on the vehicle speakers. The control module 320 may send the notification to a server and/or a database using any suitable communication network. The control module 320 may determine when to generate the notification based on a distance from the host vehicle 106 to the target vehicle 104, severity of the impact of the target vehicle 104 being on the shoulder, the time of day, the amount of traffic or any other suitable factors.

The control module 320 may determine a driving maneuver for the host vehicle 106 to avoid the target vehicle 104 based on at least a prediction of how much time the target vehicle 104 will be on the shoulder and/or whether the target vehicle is at the location when the host vehicle reaches the location. As such and as an example, the control module 320 may determine that the host vehicle 106 take an alternate route if the control module 320 predicts that the target vehicle 104 will be on the shoulder when the host vehicle reaches the location of the target vehicle 104. As another example, the control module 320 may determine an alternate route and/or a lane change. The control module 320 may initiate the driving maneuver and/or suggest the driving maneuver and request approval from the operator of the host vehicle 106.

Figure 4:
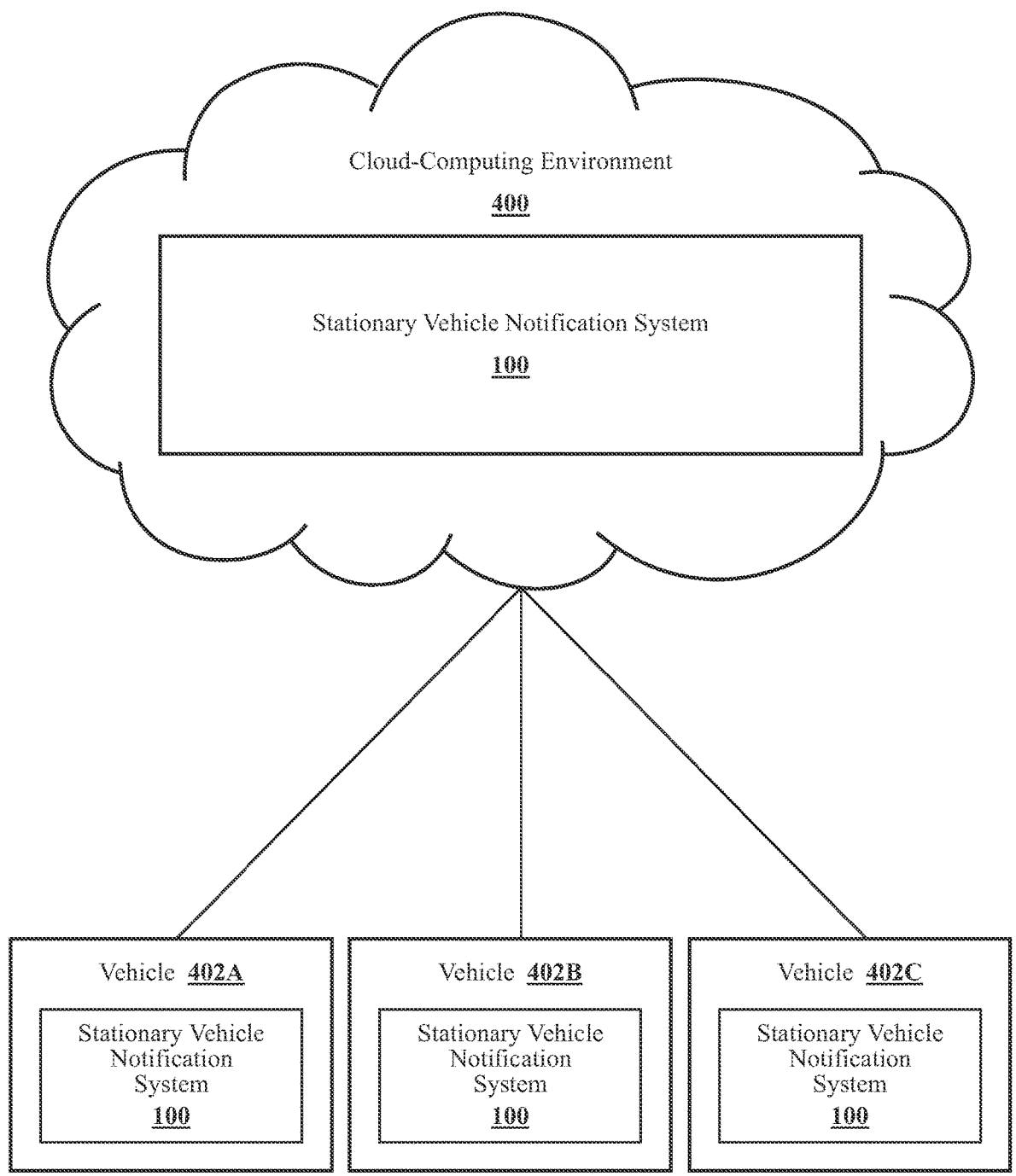
FIG. 4 illustrates a diagram of a stationary vehicle notification system in a cloud-based configuration.

The stationary vehicle notification system 100 may be further implemented as a cloud-based system that functions within a cloud-computing environment 400 as illustrated in relation to FIG. 4. That is, for example, the stationary vehicle notification system 100 may acquire telematics data (i.e., sensor data 219) from vehicles, and environment information data 360 and/or vehicle information data 370 from external sources such as an external database. The stationary vehicle notification system 100 may execute as a cloud-based resource that is comprised of devices (e.g., servers 112) remote from vehicles to generate a notification about a target vehicle 104 being on the shoulder based on vehicle characteristics such as type of vehicle and environment characteristics such as weather conditions and road conditions. Accordingly, the stationary vehicle notification system 100 may communicate with vehicles (e.g., vehicles 402A, 402B, and 402C) that are geographically distributed. In one approach, a cloud-based stationary vehicle notification system 100 may collect the data 219, 360, 370 from components or separate instances of the stationary vehicle notification system 100 that are integrated with the vehicles 402A, 402B, 402C.

Along with the communications, the vehicles 402A, 402B, 402C may provide sensor data 219. As such, vehicle-based systems may perform part of the processing while the cloud-computing environment 400 may handle a remaining portion or function to validate results of the vehicle-based systems. It should be appreciated that apportionment of the processing between the vehicle 402A, 402B, 402C and the cloud may vary according to different implementations. Additional aspects of the cloud-computing environment 400 are discussed above in relation to components of the stationary vehicle notification system 100 and FIG. 3.

Figure 5:
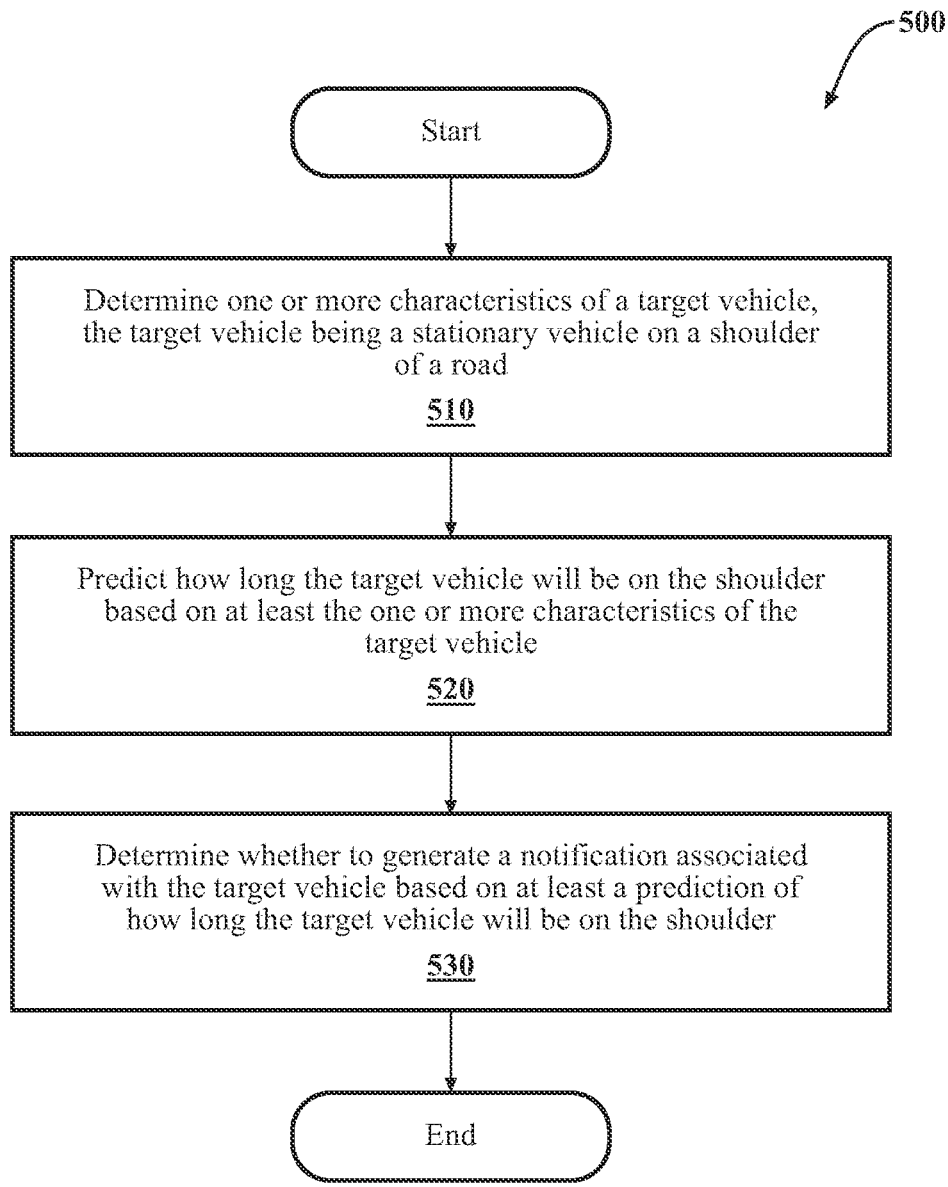
FIG. 5 is a flowchart illustrating one embodiment of a method associated with generating a notification about a target vehicle that is stationary on the shoulder of the road.

FIG. 5 illustrates a method 500 for generating a notification about the target vehicle 104 being on the shoulder of the road. The method 500 will be described from the viewpoint of the host vehicle 106 of FIGS. 1-2 and the stationary vehicle notification system 100 of FIG. 3. However, the method 500 may be adapted to be executed in any one of several different situations and not necessarily by the host vehicle of FIGS. 1-2 and/or the stationary vehicle notification system 100 of FIG. 3.

At step 510, the stationary vehicle notification system 100 may cause the processor(s) 210 to determine one or more characteristics of a target vehicle 104. As previously mentioned, the target vehicle 104 is a stationary vehicle on a shoulder of a road 101. The control module 320 may determine the characteristics of the target vehicle 104 using sensors such as vehicle sensors or roadside sensors, wireless communication with the target vehicle 104, and/or traffic updates. The control module 320 may retrieve characteristics for the target vehicle 104 from a cloud server. As previously mentioned, the characteristics of the target vehicle 104 may include vehicle type such as model, brand, style, or size, vehicle condition such as the vehicle having a flat tire, smoke or fire emitting from the vehicle, damage to the body of the vehicle, vehicle door(s) being open, the vehicle being jacked up, debris from the vehicle or other debris on the vehicle, vehicle orientation such as vehicle being upside down, vehicle facing the flow of traffic, vehicle facing the opposite of the flow of traffic, vehicle on the shoulder and close to the road, vehicle on the shoulder or being farther away from the road, e.g., close to the trees, and vehicle light status such as hazard lights are on or off, flashing rear or front lights.

At step 520, the stationary vehicle notification system may cause the processor(s) 210 to predict how much time the target vehicle 104 will be on the shoulder based on at least the one or more characteristics of the target vehicle 104. As previously mentioned, the control module 320 predict how much time the target vehicle 104 will be on the shoulder based on at least the characteristics of the target vehicle 104, the characteristics of the environment, and/or when the target vehicle 104 became stationary on the shoulder of the road 101. The control module 320 may predict how much time the target vehicle 104 will be on the shoulder using historical information and/or machine learning methods. The control module 320 may use data from sensors, databases, and/or any suitable records to determine how much time the target vehicle 104 has been stationary on the shoulder and/or how much time the target vehicle 104 may remain stationary on the shoulder.

At step 530, the stationary vehicle notification system 100 may cause the processor(s) 210 to determine whether to generate a notification associated with the target vehicle 104 based on at least a prediction of how much time the target vehicle 104 will be on the shoulder. As previously mentioned, the control module 320 may determine a sphere or distance of impact, and may then identify as host vehicles 106 one or more vehicles within the sphere or distance of impact. As an example, the control module 320 may identify the host vehicle(s) 106 within the sphere or distance of impact based on whether the host vehicle(s) 106 will reach the location of the target vehicle 104 before the target vehicle 104 is moved from the shoulder. As another example, the control module 320 may identify the host vehicle(s) 106 as being within the sphere or distance of impact based on whether there is traffic buildup or lane closures because of the target vehicle 104 that impacts the host vehicle(s) 106. The control module 320 may generate the notification based on how much time the target vehicle 104 will be on the shoulder. Additionally and/or alternatively, the control module 320 may generate notification based on whether the host vehicle 106 is impacted by the target vehicle 104 on the shoulder in relation to traffic build up or lane closures, as an example.

As previously mentioned, the control module 320 may notify the operator of the host vehicle 106. The operator may be a human if the host vehicle is manually-operated or a computer if the host vehicle is autonomously-operated. Further, the control module 320 may determine a driving maneuver to avoid the target vehicle 104 and/or the impact of the target vehicle 104.

Figure 6:
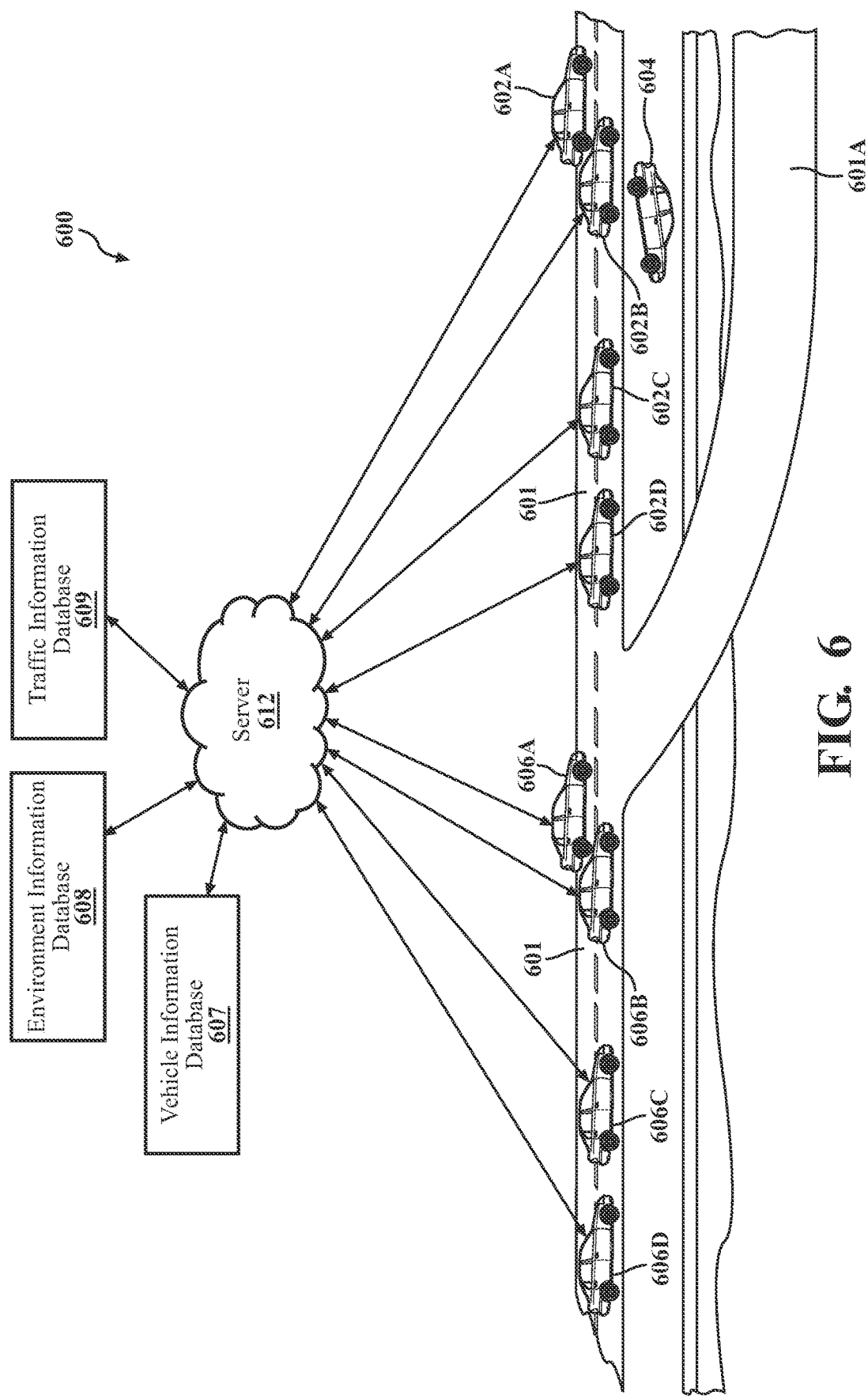
FIG. 6 is an example of a stationary vehicle notification scenario.

A non-limiting example of the operation of the stationary vehicle notification system 100 and/or one or more of the methods will now be described in relation to FIG. 6. FIG. 6 shows an example of a stationary vehicle notification scenario.

In FIG. 6, the target vehicle 604, which is similar to the target vehicle 104, is on a two-lane road 601 and surrounding vehicles 602A, 602B, 602C, 602D (collectively known as 602) are travelling proximate to the target vehicle 604. The host vehicles 606A, 606B, 606C, 606D (collectively known as 606) are behind the surrounding vehicles 602 and are travelling toward the location of the target vehicle 604 on the same road 601. The host vehicles 606 are connected to the vehicle information database 607, the environment information database 608, and the traffic information database 609 via the server 612.

The stationary vehicle notification system 600, or more specifically, the control module 320 may receive sensor data 219 from the sensor system 220 in the surrounding vehicles 602, vehicle information data 370 from a vehicle information database 607, and environment information data 360 from an environment information database 608.

The stationary vehicle notification system 600, or more specifically, the control module 320 determines the characteristics of the target vehicle 604 including the target vehicle 104 being upside down based on the sensor data 219. The stationary vehicle notification system 600, or more specifically, the control module 320 determines the characteristics of the environment including that there is no emergency service such as police, ambulance, or tow truck present.

The stationary vehicle notification system 600, or more specifically the control module 320, may then determine how much time the target vehicle 604 will be on the shoulder of the road 601 based on historical data of the how much time it takes for emergency services to arrive and remove the target vehicle 604. The control module 320 can further determine that the host vehicle(s) 606 will be impacted by a traffic jam or a road closure due to the target vehicle 604 being on the shoulder of the road 601 and the host vehicle(s) 606 reaching the location of the target vehicle 604 before the target vehicle 604 is moved from the shoulder of the road 601. As such, the control module 320 outputs a notification for the operator of the host vehicle 606 and further outputs a driving maneuver for the host vehicle 606 to avoid the impact of the target vehicle 604 being on the shoulder of the road 601. In this example, the control module 320 recommends that the host vehicle 606 take the upcoming exit 601A.

FIG. 2 will now be discussed in full detail as an example environment within which the system and methods disclosed herein may operate. In some instances, the vehicle 106 (also known as the host vehicle) may be configured to switch selectively between an autonomous mode, one or more semi-autonomous operational modes, and/or a manual mode. Such switching may be implemented in a suitable manner, now known or later developed. "Manual mode" means that all of or a majority of the navigation and/or maneuvering of the vehicle is performed according to inputs received from a user (e.g., human driver). In one or more arrangements, the vehicle 106 may be a conventional vehicle that is configured to operate in only a manual mode. "Autonomous mode" refers to navigating and/or maneuvering the vehicle 106 along a travel route using one or more computing systems to control the vehicle 106 with minimal or no input from a human driver. In one embodiment, the vehicle 106 is configured with one or more semi-autonomous operational modes in which one or more computing systems perform a portion of the navigation and/or maneuvering of the vehicle 106 along a travel route, and a vehicle operator (i.e., driver) provides inputs to the vehicle 106 to perform a portion of the navigation and/or maneuvering of the vehicle 106 along a travel route.

The vehicle 106 may include one or more processors 210. In one or more arrangements, the processor(s) 210 may be a main processor of the vehicle 106. For instance, the processor(s) 210 may be an electronic control unit (ECU). The vehicle 106 may include one or more data stores 215 for storing one or more types of data. The data store 215 may include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 may be a component of the processor(s) 210, or the data store 215 may be operatively connected to the processor(s) 210 for use thereby. The term "operatively connected," as used throughout this description, may include direct or indirect connections, including connections without direct physical contact.

In one or more arrangements, the one or more data stores 215 may include map data 216. The map data 216 may include maps of one or more geographic areas. In some instances, the map data 216 may include information or data on roads, traffic control devices, road markings, structures, features, and/or landmarks in the one or more geographic areas. The map data 216 may be in any suitable form. In some instances, the map data 216 may include aerial views of an area. In some instances, the map data 216 may include ground views of an area, including 360-degree ground views. The map data 216 may include measurements, dimensions, distances, and/or information for one or more items included in the map data 216 and/or relative to other items included in the map data 216. The map data 216 may include a digital map with information about road geometry. The map data 216 may be high quality and/or highly detailed.

In one or more arrangements, the map data 216 may include one or more terrain maps 217. The terrain map(s) 217 may include information about the ground, terrain, roads, surfaces, and/or other features of one or more geographic areas. The terrain map(s) 217 may include elevation data in the one or more geographic areas. The map data 216 may be high quality and/or highly detailed. The terrain map(s) 217 may define one or more ground surfaces, which may include paved roads, unpaved roads, land, and other things that define a ground surface.

The one or more data stores 215 may include sensor data 219. In this context, "sensor data" means any information about the sensors that the vehicle 102 is equipped with, including the capabilities and other information about such sensors. As will be explained below, the vehicle 102 may include the sensor system 220. The sensor data 219 may relate to one or more sensors of the sensor system 220. As an example, in one or more arrangements, the sensor data 219 may include information on one or more LIDAR sensors 224 of the sensor system 220.

In some instances, at least a portion of the map data 216 and/or the sensor data 219 may be located in one or more data stores 215 located onboard the vehicle 102. Alternatively, or in addition, at least a portion of the map data 216 and/or the sensor data 219 may be located in one or more data stores 215 that are located remotely from the vehicle 102.

As noted above, the vehicle 106 may include the sensor system 220. The sensor system 220 may include one or more sensors. "Sensor" means any device, component and/or system that may detect, and/or sense something. The one or more sensors may be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors may work independently from each other. Alternatively, two or more of the sensors may work in combination with each other. In such a case, the two or more sensors may form a sensor network. The sensor system 220 and/or the one or more sensors may be operatively connected to the processor(s) 210, the data store(s) 215, and/or another element of the vehicle 106 (including any of the elements shown in FIG. 2). The sensor system 220 may acquire data of at least a portion of the external environment of the vehicle 106 (e.g., nearby vehicles).

The sensor system 220 may include any suitable type of sensor. Various examples of different types of sensors will be described herein. However, it will be understood that the embodiments are not limited to the particular sensors described. The sensor system 220 may include one or more vehicle sensors 221. The vehicle sensor(s) 221 may detect, determine, and/or sense information about the vehicle 106 itself. In one or more arrangements, the vehicle sensor(s) 221 may be configured to detect, and/or sense position and orientation changes of the vehicle 102, such as, for example, based on inertial acceleration. In one or more arrangements, the vehicle sensor(s) 221 may include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 may be configured to detect, and/or sense one or more characteristics of the vehicle 102. In one or more arrangements, the vehicle sensor(s) 221 may include a speedometer to determine a current speed of the vehicle 106.

Alternatively, or in addition, the sensor system 220 may include one or more environment sensors 222 configured to acquire, and/or sense driving environment data. "Driving environment data" includes data or information about the external environment in which the vehicle is located or one or more portions thereof. The one or more environment sensors 222 may be configured to detect, measure, quantify and/or sense other objects in the external environment of the vehicle 102, such as, for example, other vehicles, the slope of the road, the condition of the surface of the road, etc.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more arrangements, the sensor system 220 may include one or more radar sensors 223, one or more LIDAR sensors 224, one or more sonar sensors 225, one or more cameras 226, and/or one or more communication sensors 227. In one or more arrangements, the one or more cameras 226 may be high dynamic range (HDR) cameras or infrared (IR) cameras. The communication sensor(s) 227 such as radio frequency identification (RFID) and near-field communication (NFC) readers may communicate with other entities using any suitable means of communication such as Wi-Fi, Bluetooth, vehicle-to-infrastructure (V2I) wireless communication, vehicle-to-everything (V2X) wireless communication, RFIC, and NFC.

The vehicle 106 may include an input system 230. An "input system" includes any device, component, system, element or arrangement or groups thereof that enable information/data to be entered into a machine. The input system 230 may receive an input from a vehicle passenger (e.g., a driver or a passenger). The vehicle 106 may include an output system 235. An "output system" includes any device, component, or arrangement or groups thereof that enable information/data to be presented to a vehicle passenger (e.g., a person, a vehicle passenger, etc.) such as a display interface.

The vehicle 106 may include one or more vehicle systems 240. Various examples of the one or more vehicle systems 240 are shown in FIG. 2. However, the vehicle 106 may include more, fewer, or different vehicle systems. It should be appreciated that although particular vehicle systems are separately defined, each or any of the systems or portions thereof may be otherwise combined or segregated via hardware and/or software within the vehicle 106. The vehicle 106 may include a propulsion system 241, a braking system 242, a steering system 243, throttle system 244, a transmission system 245, a signaling system 246, and/or a navigation system 247. Each of these systems may include one or more devices, components, and/or a combination thereof, now known or later developed.

The navigation system 247 may include one or more devices, applications, and/or combinations thereof, now known or later developed, configured to determine the geographic location of the vehicle 106 and/or to determine a travel route for the vehicle 106. The navigation system 247 may include one or more mapping applications to determine a travel route for the vehicle 106. The navigation system 247 may include a global positioning system, a local positioning system or a geolocation system.

The vehicle 106 may include one or more modules, at least some of which are described herein. The modules may be implemented as computer-readable program code that, when executed by a processor 210, implement one or more of the various processes described herein. One or more of the modules may be a component of the processor(s) 210, or one or more of the modules may be executed on and/or distributed among other processing systems to which the processor(s) 210 is operatively connected. The modules may include instructions (e.g., program logic) executable by one or more processor(s) 210. Alternatively, or in addition, one or more data store 215 may contain such instructions.

In one or more arrangements, one or more of the modules described herein may include artificial or computational intelligence elements, e.g., neural network, fuzzy logic or other machine learning algorithms. Further, in one or more arrangements, one or more of the modules may be distributed among a plurality of the modules described herein. In one or more arrangements, two or more of the modules described herein may be combined into a single module.

The vehicle 106 may include one or more autonomous driving modules 260. The autonomous driving module(s) 260 either independently or in combination with the stationary vehicle notification system 100 may be configured to determine travel path(s), current autonomous driving maneuvers for the vehicle 106, future autonomous driving maneuvers and/or modifications to current autonomous driving maneuvers based on data acquired by the sensor system 220, driving scene models, and/or data from any other suitable source such as determinations from the sensor data 219. "Driving maneuver" means one or more actions that affect the movement of a vehicle. Examples of driving maneuvers include: accelerating, decelerating, braking, turning, moving in a lateral direction of the vehicle 106, changing travel lanes, merging into a travel lane, and/or reversing, just to name a few possibilities. The autonomous driving module(s) 260 may be configured to implement determined driving maneuvers. The autonomous driving module(s) 260 may cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 260 may be configured to execute various vehicle functions and/or to transmit data to, receive data from, interact with, and/or control the vehicle 106 or one or more systems thereof (e.g., one or more of vehicle systems 240).

The processor(s) 210, the stationary vehicle notification system 100, and/or the autonomous driving module(s) 260 may be operatively connected to communicate with the various vehicle systems 240 and/or individual components thereof. For example, the processor(s) 210, the stationary vehicle notification system 100, and/or the autonomous driving module(s) 260 may be in communication to send and/or receive information from the various vehicle systems 240 to control the movement, speed, maneuvering, heading, direction, etc. of the vehicle 106. The processor(s) 210, the stationary vehicle notification system 100, and/or the autonomous driving module(s) 260 may control some or all of these vehicle systems 240 and, thus, may be partially or fully autonomous. The processor(s) 210, the stationary vehicle notification system 100, and/or the autonomous driving module(s) 260 may cause the vehicle 106 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 106 may include one or more actuators 250. The actuators 250 may be any element or combination of elements operable to modify, adjust and/or alter one or more of the vehicle systems 240 or components thereof to responsive to receiving signals or other inputs from the processor(s) 210 and/or the autonomous driving module(s) 260. Any suitable actuator may be used. For instance, the one or more actuators 250 may include motors, pneumatic actuators, hydraulic pistons, relays, solenoids, and/or piezoelectric actuators, just to name a few possibilities.

It will be appreciated that arrangements described herein may provide numerous benefits, including one or more of the benefits mentioned herein. For example, arrangements described herein may result in reducing the risk of a vehicular collision. The arrangements described herein may also result in traffic decongestion.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components and/or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having." as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor; and
   a memory storing machine-readable instructions that, when executed by the processor, cause the processor to:
   determine one or more characteristics of a target vehicle, the target vehicle being a stationary vehicle on a shoulder of a road;
   predict how much time the target vehicle will be on the shoulder based on at least the one or more characteristics of the target vehicle; and
   determine whether to generate a notification associated with the target vehicle based on at least a prediction of how much time the target vehicle will be on the shoulder.

2. The system of claim 1, wherein the one or more characteristics of the target vehicle include one or more of:
   a vehicle type;
   a vehicle condition;
   a vehicle orientation; or
   a vehicle light status.

3. The system of claim 1, wherein the machine-readable instructions further include instructions that when executed by the processor cause the processor to:
   determine how much time it will take for a host vehicle to reach a location of the target vehicle; and
   determine whether to generate the notification associated with the target vehicle based on at least a prediction of whether the target vehicle is at the location when the host vehicle reaches the location.

4. The system of claim 1, wherein the machine-readable instructions further include instructions that when executed by the processor cause the processor to:
   determine a driving maneuver for a host vehicle to avoid the target vehicle based on at least a prediction of whether the target vehicle is at a location when the host vehicle reaches the location.

5. The system of claim 1, wherein the machine-readable instructions further include instructions that when executed by the processor cause the processor to:
   determine one or more characteristics of an environment surrounding the target vehicle; and
   predict how much time the target vehicle will be on the shoulder based on at least the one or more characteristics of the environment.

6. The system of claim 5, wherein the one or more characteristics of the environment include one or more of:
   a weather condition;
   a road condition;
   a person proximate to the target vehicle; or
   an other vehicle proximate to the target vehicle.

7. The system of claim 1, wherein the machine-readable instructions further include instructions that when executed by the processor cause the processor to:
   determine when the target vehicle became stationary on the shoulder.

8. A method comprising:
   determining one or more characteristics of a target vehicle, the target vehicle being a stationary vehicle on a shoulder of a road;
   predicting how much time the target vehicle will be on the shoulder based on at least the one or more characteristics of the target vehicle; and
   determining whether to generate a notification associated with the target vehicle based on at least a prediction of how much time the target vehicle will be on the shoulder.

9. The method of claim 8, wherein the one or more characteristics of the target vehicle include one or more of:
   a vehicle type;
   a vehicle condition;
   a vehicle orientation; or
   a vehicle light status.

10. The method of claim 8, further comprising:
    determining how much time it will take for a host vehicle to reach a location of the target vehicle; and
    determining whether to generate the notification associated with the target vehicle based on at least a prediction of whether the target vehicle is at the location when the host vehicle reaches the location.

11. The method of claim 8, further comprising:
    determining a driving maneuver for a host vehicle to avoid the target vehicle based on at least a prediction of whether the target vehicle is at a location when the host vehicle reaches the location.

12. The method of claim 8, further comprising:
    determining one or more characteristics of an environment surrounding the target vehicle; and
    predicting how much time the target vehicle will be on the shoulder based on at least the one or more characteristics of the environment.

13. The method of claim 12, wherein the one or more characteristics of the environment include one or more of:

a weather condition;
a road condition;
a person proximate to the target vehicle; or
an other vehicle proximate to the target vehicle.

14. The method of claim 8, further comprising:
determining when the target vehicle became stationary on the shoulder.

15. A non-transitory computer-readable medium including instructions that when executed by a processor cause the processor to:
determine one or more characteristics of a target vehicle, the target vehicle being a stationary vehicle on a shoulder of a road;
predict how much time the target vehicle will be on the shoulder based on at least the one or more characteristics of the target vehicle; and
determine whether to generate a notification associated with the target vehicle based on at least a prediction of how much time the target vehicle will be on the shoulder.

16. The non-transitory computer-readable medium of claim 15, wherein the one or more characteristics of the target vehicle include one or more of:
a vehicle type;
a vehicle condition;
a vehicle orientation; or
a vehicle light status.

17. The non-transitory computer-readable medium of claim 15, wherein the instructions further include instructions that when executed by the processor cause the processor to:
determine how much time it will take for a host vehicle to reach a location of the target vehicle; and
determine whether to generate the notification associated with the target vehicle based on at least a prediction of whether the target vehicle is at the location when the host vehicle reaches the location.

18. The non-transitory computer-readable medium of claim 15, wherein the instructions further include instructions that when executed by the processor cause the processor to:
determine a driving maneuver for a host vehicle to avoid the target vehicle based on at least a prediction of whether the target vehicle is at a location when the host vehicle reaches the location.

19. The non-transitory computer-readable medium of claim 15, wherein the instructions further include instructions that when executed by the processor cause the processor to:
determine one or more characteristics of an environment surrounding the target vehicle; and
predict how much time the target vehicle will be on the shoulder based on at least the one or more characteristics of the environment.

20. The non-transitory computer-readable medium of claim 19, wherein the one or more characteristics of the environment include one or more of:
a weather condition;
a road condition;
a person proximate to the target vehicle; or
an other vehicle proximate to the target vehicle.

* * * * *